(12) United States Patent
Masse et al.

(10) Patent No.: US 10,514,212 B2
(45) Date of Patent: Dec. 24, 2019

(54) DEVICE AND METHOD FOR CONTROLLING A PHASE TRANSITION OF A FLUID BETWEEN LIQUID AND VAPOUR STATES

(71) Applicant: Edwards Limited, Burgess Hill, West Sussex (GB)

(72) Inventors: Daniel Masse, Woburn, MA (US); Ali Shajii, Weston, MA (US); Michael McBrien, Glastonbury, CT (US)

(73) Assignee: Edwards Limited, Burgess Hill, West Sussex (GB)

( * ) Notice: Subject to any disclaimer, the term of this patent is extended or adjusted under 35 U.S.C. 154(b) by 0 days.

(21) Appl. No.: 15/738,474

(22) PCT Filed: May 23, 2016

(86) PCT No.: PCT/GB2016/051482
§ 371 (c)(1),
(2) Date: Dec. 20, 2017

(87) PCT Pub. No.: WO2016/207598
PCT Pub. Date: Dec. 29, 2016

(65) Prior Publication Data
US 2018/0187986 A1     Jul. 5, 2018

(30) Foreign Application Priority Data

Jun. 23, 2015   (GB) .................................. 1511012.5

(51) Int. Cl.
*F28F 27/00*       (2006.01)
*F28F 9/22*        (2006.01)
(Continued)

(52) U.S. Cl.
CPC .............. *F28F 9/22* (2013.01); *B01D 1/0082* (2013.01); *B01D 1/04* (2013.01); *B01D 5/0009* (2013.01); *B01D 5/0051* (2013.01)

(58) Field of Classification Search
CPC ......... F25B 15/008; F28F 9/22; F22B 1/1815; B01D 1/0082; B01D 1/04; B01D 5/0009; B01D 5/0051; B01D 5/0081; Y02P 80/156
(Continued)

(56) References Cited

U.S. PATENT DOCUMENTS 3,740,967 A   6/1973   Huelle
4,281,709 A   8/1981   Busse
(Continued)

FOREIGN PATENT DOCUMENTS

WO     2009137472 A1    11/2009

OTHER PUBLICATIONS

British Search Report dated Dec. 21, 2015 for corresponding British Application No. GB1511012.5.
PCT Search Report and Written Opinion dated Jul. 22, 2016 for corresponding PCT Application No. PCT/GB2016/051482.

*Primary Examiner* — Davis D Hwu
(74) *Attorney, Agent, or Firm* — Westman, Champlin & Koehler, P.A.; Theodore M. Magee (57) ABSTRACT

A device and method for changing a fluid from one state to another state, the states comprising a liquid and a vapour state are disclosed. The device comprises: an inlet configured to receive the fluid in a first state; an outlet configured to output the fluid in a second state; and a conduit connecting the inlet to the outlet. The conduit is configured such that a resistance to flow changes along at least a portion of a flow axis within the conduit. The device further comprises a controller configured to control a location of a region within the portion of the conduit in which the fluid changes state by (Continued)

controlling at least one of a temperature of the fluid and a pressure at at least one of the inlet and the outlet.

18 Claims, 4 Drawing Sheets

(51) Int. Cl.
   *B01D 1/00* (2006.01)
   *B01D 1/04* (2006.01)
   *B01D 5/00* (2006.01)

(58) Field of Classification Search
   USPC .......................................................... 165/272
   See application file for complete search history.

(56) References Cited

U.S. PATENT DOCUMENTS

| | | | |
|---|---|---|---|
| 5,157,942 A * | 10/1992 | Dao | F25B 15/008 |
| | | | 62/476 |
| 6,321,567 B1 | 11/2001 | Lockett et al. | |
| 2007/0084418 A1* | 4/2007 | Gurevich | F22B 1/1815 |
| | | | 122/1 B |
| 2007/0235165 A1 | 10/2007 | Liu et al. | |
| 2008/0099191 A1 | 5/2008 | Taras et al. | |
| 2010/0058606 A1 | 3/2010 | Nakashima et al. | |
| 2012/0103428 A1 | 5/2012 | Turner et al. | |
| 2014/0054014 A1 | 2/2014 | Dai et al. | |

\* cited by examiner

DEVICE AND METHOD FOR CONTROLLING A PHASE TRANSITION OF A FLUID BETWEEN LIQUID AND VAPOUR STATES

CROSS-REFERENCE OF RELATED APPLICATION

This application is a Section 371 National Stage Application of International Application No. PCT/GB2016/051482, filed May 23, 2016, which is incorporated by reference in its entirety and published as WO 2016/207598 A1 on Dec. 29, 2016 and which claims priority of British Application No. 1511012.5, filed Jun. 23, 2015.

FIELD

The field of the invention relates to devices and methods for controlling a change of state of a fluid.

BACKGROUND

A fluid will change state depending on its temperature and the external or ambient pressure. In this regard a liquid will change to a vapour when its vapour pressure becomes equal to or exceeds the external pressure acting on the liquid. Increasing the temperature of the liquid increases its vapour pressure. As a liquid changes to a vapour it absorbs energy from its surroundings. Similarly when a vapour condenses it releases energy to its surroundings and the temperature rises. Controlling the vaporisation of a liquid or the reverse process of condensation to provide a stable process is not without difficulties.

Known ways in which a liquid may be changed into a vapour include heating of the liquid and reducing the ambient pressure, by for example the direct injection of the liquid into a low-pressure chamber. However, as noted above a liquid vaporising absorbs energy and as such heat may also be required to supply the necessary energy. Alternatively a carrier gas or dilution gas can be added to the liquid or liquid/vapour mixture. This reduces the partial pressure of the vapour phase of the fluid and causes additional vaporisation. However, such devices require pumps and valves in addition to heaters. Devices with moving parts experience wear and require servicing.

It would be desirable to provide a device and method that controls a change in state of a fluid in a stable and controllable manner.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect of the embodiments provides a device for changing a fluid from one state to another state, said states comprising a liquid and a vapour state, said device comprising: an inlet configured to receive said fluid in a first state; an outlet configured to output said fluid in a second state; a conduit connecting said inlet to said outlet, said conduit being configured such that a resistance to flow changes along at least a portion of a flow axis within said conduit; and a controller configured to control a location of a region within said portion of said conduit in which said fluid changes state by controlling at least one of a temperature of said fluid and a pressure at at least one of said inlet and said outlet.

The present inventors recognised that a changing resistance to flow along a conduit will affect when a fluid flowing through the conduit changes state. In this regard if the fluid is to be vaporised a continual decrease in resistance to flow will encourage vaporisation by reducing the ambient pressure experienced by the fluid, while if the fluid is to be condensed a continual increase in resistance to flow will encourage condensation. Passing a fluid through a conduit which has a changing resistance to flow and controlling the temperature and/or pressure of the fluid while the resistance to flow is changing provides a device where the location at which the change of state occurs can be confined and more accurately controlled.

Being able to control the point at which this change of state occurs can be advantageous in many fields. For example, where it is important to achieve stable and complete vaporisation, being able to control the point of vaporisation such that it occurs within the area of changing resistance reduces instabilities arising in the process and provides a stable and controllable state change. In this regard edge effects towards the edge of a conduit can affect the stability of the change of state and thus, being able to avoid the change of state occurring at or close to these regions is advantageous.

Controlling the point of state change also affects the mass flow rate through the conduit and thus, such a device can also be used to control or measure mass flow rate. This is because a liquid is much denser than a gas and the resistance to flow of the gas is much greater for the same mass flow rate, so that the more gas there is in the conduit the more resistance to flow the fluid experiences. Thus, where the change of state is such that there is an increase in the amount of gas within the conduit compared to the amount of liquid then the flow rate will decrease. Conversely where the change of state is such that there is a decrease in the amount of gas then the flow rate will increase.

It should be noted that the conduit is any structure that can provide one or more fluid paths from an inlet to an outlet. It may be an elongate structure, but equally it may have a different form.

In some embodiments said device comprises a controlled condenser, said first state comprising a gas and said second state comprising a liquid, said fluid flow being in a direction such that said resistance to flow increases along said at least a portion of said flow axis of said conduit such that said resistance to flow is higher closer to said outlet than it is closer to said inlet.

The device may comprise a controlled condenser wherein a gas enters at the inlet and flows in a direction with an increasing resistance to flow thereby encouraging condensation. Control of the temperature and/or pressure of the fluid controls the point at which the fluid condenses and in this way a controlled condenser is provided where stable condensation is achieved within the portion of the conduit where the resistance to flow is increasing. An increasing resistance to flow encourages condensation and leads to a stable condenser with a confined area of condensation the location of which can be controlled by the temperature and/or pressure of the fluid.

In some embodiments, the controlled condenser comprises a cooler for cooling the fluid within the conduit. In this regard, cooling the fluid encourages condensation and it may be advantageous to provide a cooler to cool the fluid within the conduit.

Alternatively and/or additionally, the fluid may be cooled prior to entering the device or the fluid may be such that a chemical reaction within the fluid cools it.

In other embodiments, said device comprises a controlled vaporisation device, and said first state comprises a liquid and said second state comprises a vapour, said fluid flow being in a direction such that said resistance to flow decreases along said at least a portion of said flow axis of said conduit such that said resistance to flow is higher closer to said inlet than it is closer to said outlet.

If the fluid flow travels in a direction such that the resistance to flow decreases along at least a portion of the flow axis then the device can act as a stable vaporiser where the region of vaporisation is controlled by at least one of the temperature and pressure to remain within the portion of the flow axis where the resistance to flow is decreasing. In this regard, the decrease in the resistance to flow encourages vaporisation and thus, controlling vaporisation to be within this portion reduces the size of the region in which vaporisation occurs and provides a stable vaporisation of the fluid.

In some embodiments, said controlled vaporisation device further comprises a heater configured to supply heat to a fluid within said conduit.

In order to encourage vaporisation heat may be applied to the fluid and this heat may be applied prior to the fluid entering the conduit or in some embodiments it may occur within the conduit. The heat may be provided by a heater around the edge of the conduit or in some other way such as by inductive heating. Alternatively and/or additionally, the liquid may be heated prior to being input to the device or heat may be acquired from the ambient surroundings. Alternatively and/or additionally, there may be some exothermic chemical reaction occurring within the fluid which acts to heat it and encourage vaporisation.

Although, the controller may be configured to control just the pressure of the fluid, in some embodiments it is additionally and/or alternatively configured to control the heat applied to the fluid.

In this regard, controlling the heat applied to the fluid is an effective way of controlling the region in which the region of state change occurs.

In some embodiments, said controller is configured to maintain said region of state change within said portion of said conduit.

As noted previously, where the region of state change occurs within the portion of the conduit where there is a change in the resistance to flow along the flow axis then this can provide a stable change of state. Thus, it is advantageous in some embodiments if the controller is configured to wholly confine and maintain the region of state change within this portion of the conduit. In this regard, in some cases it may be advantageous if the region of state change is confined such that it is towards the centre of this region. In any case it is advantageous if vaporisation occurs wholly within the conduit and not more than 2% of the total length of the flow axis from either the input or the output.

In some embodiments, said device is configured to control a mass flow rate of a fluid flowing through said conduit by controlling said location of said region of state change.

As mentioned previously, the proportion of the fluid within the conduit that is in the liquid state and the proportion that is in the gas state affects the mass flow rate of the fluid in that the resistance to flow of a vapour is higher than that of a liquid owing to its decreased density. Thus, controlling the location of the region of state change is one way of controlling the mass flow rate of the fluid flowing and in effect a device that operates in a similar way to a valve for controlling mass flow rate is achieved without the need for moving parts. Thus, a device a long life time and low servicing requirements is provided.

In some embodiments, said controller is configured to control said temperature of said fluid and said device comprises a thermal valve.

In the case that the flow rate is controlled by the temperature then the device acts as a thermal valve and the rate of flow of a fluid can be controlled simply by its temperature leading to a device that acts as a valve yet does not have the attendant disadvantages such as orifices that require unblocking and moving parts that require servicing.

In some embodiments, said device further comprises a measuring device configured to measure a parameter indicative of said flow rate of said fluid flowing through said conduit, said controller adjusting said at least one of said temperature of said fluid and said pressure at least one of said inlet and said outlet in response to an output from said measuring device.

Where the device acts as a mass flow rate controller then in some cases it may be advantageous to provide a feedback mechanism wherein the flow rate is measured and where it is not the desired rate the controller will adjust at least one of the temperature of the fluid and the pressure of the fluid to alter the flow rate and realign it with the desired value.

Although the parameter that is measured may be any number of things that indicate the flow rate of the fluid, in some embodiments, said parameter measuring device is configured to measure at least one of a pressure of said vapour across an orifice and a temperature variation along said conduit to determine said region of state change.

One simple way of measuring flow rate is to use a critical orifice and measure the pressure across it. Alternatively, a temperature variation along the conduit could be monitored and an area where there is a temperature change will indicate latent heat due to a change in state and is an indication of the point at which the change of state is occurring and from this the mass flow rate can be derived.

In some embodiments, said device further comprises at least one metering device configured to measure at least one of a temperature and a pressure of said fluid, said device being operable to determine a flow rate of said fluid from said at least one measurement; and an output device configured to output said flow rate.

As noted previously, the location of the change of state affects the mass flow rate through the conduit and this in turn can be controlled by the temperature of the fluid and the pressure at the inlet and outlet. Thus, in some cases the device can be used as a metering device to measure flow rate where at least one of temperature and pressure is measured. Only one value needs to be measured if the other values are known values. If they are not then each value will need to be measured. These values in conjunction with the characteristics of the conduit can be used to derive the mass flow rate.

In some embodiments, said conduit is configured such that an effective hydraulic diameter of said conduit increases in one direction along said flow axis within said at least a portion of said conduit leading to a decrease in said resistance to fluid flow in said direction.

The change in resistance to flow may be provided by a change in effective hydraulic diameter of the conduit, an increase in the hydraulic diameter leading to a decrease in the resistance to fluid flow and similarly a decrease in the conduit leading to an increase in the resistance to fluid flow.

This change in effective hydraulic diameter may be provided by the conduit being configured such that a cross sectional area available for fluid flow of said conduit increases in one direction along said at least a portion of said conduit leading to a decrease in said resistance to fluid flow in said direction.

In some embodiments, said conduit is at least partially filled with a material such that multiple fluid flow paths are provided through said material.

Although, the conduit may be hollow, it may be advantageous if it is at least partially filled with a material that provides multiple flow paths. This material can be used to change the resistance to flow and also if it has a high thermal conductivity it can be used as a method of providing heating or cooling to the fluid in an efficient manner allowing for accurate and fast control of the location of the region of state change. It also provides a high surface area to volume ratio which encourages changes of state.

This filling material may comprise a number of things provided that multiple flow paths are provided. In some embodiments at least one of a number of said fluid flow paths and a diameter of said fluid flow paths increase in one direction along said at least a portion of said conduit leading to a decrease in resistance to flow in said direction.

The change in resistance to flow may be provided by a number of the fluid flow paths and/or a diameter of the fluid flow paths increasing in one direction along at least a portion of the conduit leading to a decrease in resistance flow in that direction. This change in fluid flow paths may be provided by filling materials that have a decreasing porosity. This decreasing porosity may occur as a gradual change or there may be multiple plugs of material each with a different porosity.

In some embodiments, said conduit is an elongate structure and said flow axis is a longitudinal axis of said conduit and at least one of a number of said fluid flow paths and a diameter of said fluid flow paths decreases towards an outer edge of said longitudinal axis of said conduit.

Where the conduit is an elongate structure and heat is supplied to the fluid via a heater on the outer surface of the conduit then it may be advantageous if the resistance to flow decreases towards the centre of the conduit as this will provide lower pressure in the centre such that the time delay to increases in temperature experienced by the fluid towards the centre is compensated for by this decrease in pressure. In a vaporiser where the conduit is heated from the outside then fluid in the centre will be at a lower temperature. Providing a lower pressure towards the centre allows the fluid to vaporise at a lower temperature and thus, the location of state change may occur at substantially the same location across the width of the conduit. This improves control of the location of the change of state and in particular, makes it easier to confine the change of state within a particular portion of the conduit. The change of state is more stable when it is confined within the portion of the conduit where the resistance to flow changes and this is more easily done if the location of change of state occurs across a smaller portion of the flow axis.

In other embodiments, said conduit is an elongate structure and said flow axis is a longitudinal axis of said conduit and at least one of a number of said fluid flow paths and a diameter of said fluid flow paths increases towards an outer edge of said longitudinal axis of said conduit.

Where the device is a condenser and a cooler is provided on the outer surface of the conduit then it may be advantageous if the resistance to flow increases towards the centre of the conduit as the time delay to decreases in temperature experienced by the fluid towards the centre is compensated for by this increase in pressure, leading to the state change occurring in substantially the same location across the width of the conduit.

In some embodiments, said material is a material with a higher thermal conductivity than that of said fluid.

As noted previously, a material within the conduit with a high thermal conductivity is one way of effectively controlling the temperature of the fluid within that conduit. The device is improved provided the material has a higher thermal conductivity than that of the fluid. Clearly if it has a substantially higher thermal conductivity then the performance will be better. A thermal conductivity of greater than 0.1 W/m/K is advantageous and in particular one above 10 W/m/K.

Although the material can comprise a number of things provided multiple fluid flow paths are provided, one material that is particularly effective is sintered metal. This has controllable porosity and also a high thermal conductivity.

In some embodiments, there may be an obstructing member within the conduit.

In some embodiments, said conduit comprises an elongate structure with an obstructing member running along a longitudinal axis of and within said at least a portion of said conduit.

The obstructing member may be configured such that its diameter changes and thus, it contributes to or in some cases provides the change in resistance to flow by changing the effective hydraulic diameter.

In some embodiments, the device further comprises at least one of a heater configured to heat said obstructing member and a cooler configured to cool said obstructing member.

The temperature control may be provided by a heater and/or a cooler that may be provided on the obstructing member. In this way, heating and cooling of the fluid may be provided within the conduit which again is an effective way of controlling the temperature change of the fluid across the width or diameter of the conduit. In some cases it may be provided on the obstructing member in addition to on the outer surface of the conduit.

Although, the device will function with a single conduit, in some embodiments the device comprises a plurality of these conduits each able to control a location of change of state within a portion of the conduit where the resistance to flow changes.

In some embodiments, the device comprises a pressure controller for controlling a pressure of said fluid at least one of said inlet and said outlet.

It may be advantageous to control the pressure at at least one of the inlet and the outlet. Not only does this help control the location of the change of state but it also increases the range of operation of the device.

A second aspect of the embodiments provides a method of changing a fluid from one state to another state, said states comprising a liquid and a vapour state, said method comprising receiving said fluid in a first state at an inlet; flowing said fluid through a conduit connecting said inlet to an outlet, said conduit being configured such that a resistance to flow changes along at least a portion of a flow axis within said conduit; and outputting said fluid in a second state at an outlet; controlling a location of a region within said portion of said conduit in which said fluid changes state by controlling at least one of a temperature of said fluid and a pressure at least one of said inlet and said outlet.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

The embodiments will now be described further, with reference to the accompanying drawings, in which.

DESCRIPTION OF THE EMBODIMENTS

Before discussing the embodiments in any more detail, first an overview will be provided.

A device and method are disclosed where a property along a flow axis of a fluid channelling member varies. The device is used to vaporise a liquid or condense a vapour, the change of state occurring in the portion of the element with the variable property. The flow direction through the conduit is arranged so that the resistance to flow decreases where vaporisation is desired and increases where condensation is required. This aids the change in state process and allows with suitable control of temperature and/or pressure the location at which the change in state occurs to be controlled and to be maintained within the region where the property varies. This increases the stability of the process and in turn increases controllability.

The varying property may be the effective hydraulic diameter such that the resistance to flow will increase or decrease depending on direction of flow. In some cases, the conduit will contain a porous material providing a large surface area to volume which will encourage changes in state and also provide a means of conveying temperature change to the fluid, particularly where the porous element has a higher thermal conductivity than the fluid.

Figure 1:
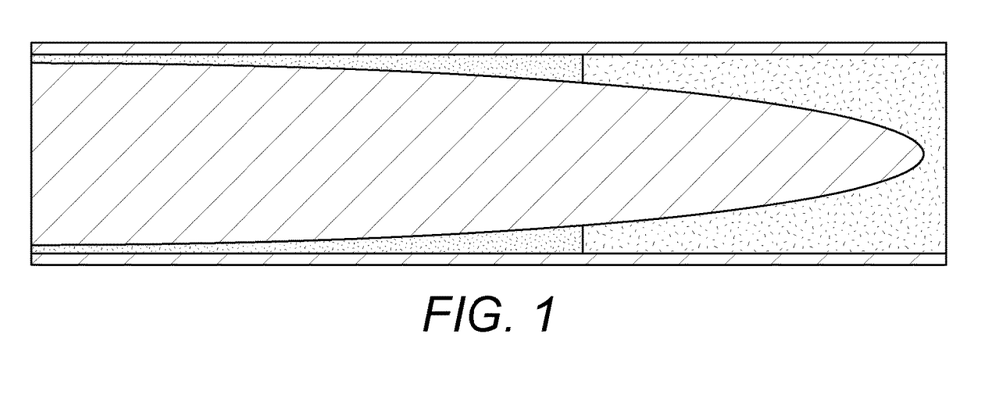
FIG. 1 illustrates a conduit with obstructing member according to an embodiment.

FIG. 1 schematically shows a conduit with an increasing hydraulic diameter from left to right, provided by an obstructing member with a decreasing diameter. This produces a changing resistance to flow which provides a stable region of change of state indicated by the change in colour. The flow path is provided with a porous material which provides a high surface area to volume ration and encourages vaporisation.

Considering how the device functions, we see that the bulk temperature of the device can be used to control the location of vaporisation of the device. If we consider the limit cases where for example, the device of FIG. 1 is simply used as a flow restrictor with a constant pressure drop across the device then if liquid water flows through the device and mass flow rate is measured it would be far higher than if water vapour flows through the device.

Now, consider using the same device as a vaporiser. Applying sufficient heat to the outside of the device or to the obstructing member and using the same pressure drop results in liquid water fed into the inlet forming water vapour within the conduit which exits at the outlet. The mass flow rate measured will be somewhere between the mass flow rates measured previously for 100% liquid and the mass flow rate that would occur if 100% gas flowed through the conduit. This is because part of the device contains liquid and part contains gas. In effect, as the proportion of the device which contains liquid increases then the mass flow rate will also increase. The liquid portion of the device is determined by the vaporisation location and thus, controlling this location by for example controlling the heat applied to the fluid, will control the mass flow rate.

Figure 2:
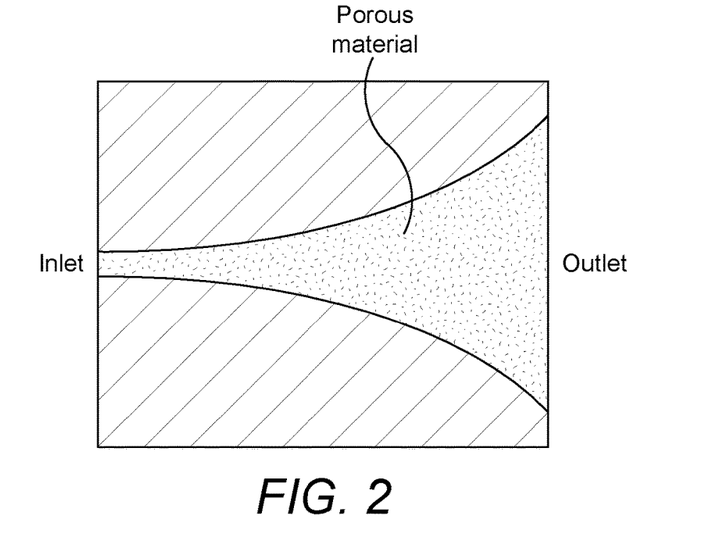
FIG. 2 illustrates a conduit according to an embodiment.

FIG. 2 schematically shows a cross section through a cylindrical conduit that is internally shaped to provide an exponential change in cross sectional area along the longitudinal axis and where the fluid flow area within the conduit is filled with a porous material.

In this embodiment, when the device acts as a controlled vaporisation device and the inlet is at the end of the conduit that has the smallest hydraulic diameter and corresponding greatest resistance to flow and the outlet is at the conduit end with the largest hydraulic diameter and corresponding lowest resistance to flow. If the device were to be used as a condenser then the direction of flow would be reversed. Thus, in the vaporiser embodiment a liquid chemical enters on the left, is vaporised inside the device, and leaves as vapour on the right. There exists a pressure difference across the device, the pressure being higher on the left, the liquid side, which in turn forces a net flow rate from left to right.

Heat is added to the device from an external heater (not shown) in the vaporiser embodiment and this provides the energy required to vaporise the liquid. The temperature is monitored although this is not shown and controlled using the heat input by the heater. The control of the temperature determines where the vaporisation occurs within the conduit and this in turn determines the mass flow rate of the liquid.

In this regard, any chemical will have a much higher density in its liquid phase than it does in its gas phase. So, for the same overall mass flow rate through the device, the volumetric flow rate required for the liquid phase is much lower than that required for the gas phase. Mass flow rate is of course constant into and out of the device as no material is lost. If the device had a uniform cross sectional area and a uniform porosity there would be a much lower pressure drop across the liquid phase than the gas phase per unit length. This can lead to unstable operation in such an axially uniform device.

Thus, to provide a controlled, stable region of vaporisation it is desirable if this vaporisation region is located near the centre of the device or at least completely contained within the conduit shown so that it will not be affected by the entrance or exit effects of the device. The varying property along the length of the device, in this case the varying diameter, causes the device to be less and less restrictive to fluid flow encouraging vaporisation along the length. In this regard, the location of the vaporisation region within the device is a function of the inlet and outlet pressures, the properties of the chemical, the axial flow restriction profile of the device and the bulk temperature of the device. Within the device, at a constant bulk temperature, the chemical fluid changes phase from liquid to gas when its pressure falls below its vapour pressure, in this regard, the pressure in the conduit is highest at the inlet and lowest at the outlet and thus, as it travels along the pressure will fall and thus, it is more likely that the liquid will vaporise. Furthermore, the chemical vapour pressure is a strong function of its temperature, as temperature increases so does its vapour pressure.

So, for a constant inlet and outlet pressure for a certain device constructed in the manner described the bulk temperature of the device can be used to control the location of the vaporisation region along the axis of the device.

Alternatively, if bulk temperature is constant the pressure at one or both ends of the device can control the location of the vaporisation region. In this regard, it is the differential pressure that affects the location of the vaporisation region. However, in some cases either the inlet or the outlet pressure will be constant and thus, the other pressure can control the vaporisation region. In still other embodiments, both the bulk temperature and one or more of the inlet and outlet pressures can be used to control the location of the vaporisation region.

For a vaporisation device a higher bulk temperature will increase the vapour pressure of the chemical and move the vaporisation region towards the inlet of the device. A lower bulk temperature will decrease the vapour pressure and move the vaporisation region towards the outlet of the device. Where stable vaporisation is required it is desirable that the vaporisation region is located completely within the conduit. Changing the temperature and/or pressure can be used to move this region of vaporisation to its desired position providing a stable vaporiser.

It should be understood that where the device is used in reverse such that the inlet becomes the outlet and the outlet the inlet then it could be used as a condenser with a cooler used rather than a heater and the region of condensation being controlled to maintain it within the conduit and maintain a stable condensation.

It has been found that an exponential reduction in restrictiveness along the flow axis of the device gives a particularly effective range and stability in mass flow rate control.

Figure 3:
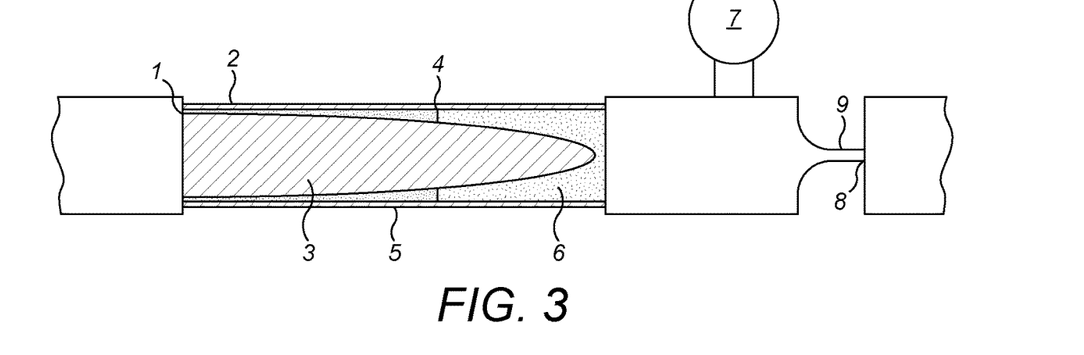
FIG. 3 illustrates the conduit with obstructing member of FIG. 1 when integrated into a vapour flow control system according to an embodiment.

FIG. 3 shows an alternative embodiment similar to that of FIG. 1 having a conduit 2 and an obstructing member 3. The obstructing member 3 provides the change in the diameter of fluid flow seen by the fluid. In some embodiments, there may additionally be porous materials within the conduit and the porosity of the materials may change from a low porosity at the end with the smaller hydraulic diameter to a higher porosity as the hydraulic diameter increases. In this way, both the porosity and the diameter seen by the fluid flow in the conduit provide a decrease in resistance to flow. Thus, if the inlet is on the left side and the outlet on the right side the device will act as a stable vaporiser if temperature and pressure are controlled accordingly. While if the inlet is on the right side and the outlet on the left side it can be used as a stable condenser.

In this embodiment, the device acts as a vaporiser and there is a liquid inlet on the left hand side at 1 and conduit 2 provides an exponential increase in cross sectional area for the fluid flow with the obstructing member 3 being formed of a solid material. Interface 4 schematically shows the liquid vapour transition location whilst 5 shows a heating device to control the temperature of the conduit. Porous material 6 fills the conduit in this embodiment. Vapour output 8 has a pressure sensor 7 to sense the pressure of the vapour at the output. Orifice 9 is used at the output to aid pressure sensing. The pressure sensor 7 provides an indication of the location of the liquid vapour transition 4 and detected changes in pressure can be used to adjust the heat and thereby control the transition and keep it in a steady location. As the location of the liquid vapour transition affects the mass flow rate the mass flow rate of liquid flowing through the device can be controlled in this way. Thus, the device of FIG. 3 provides an effective way of providing a desired mass flow rate of a vapour that can be used to supply a system such as a semi-conductor treatment plant with a controlled amount of vapour reagent without the need to have moving parts which require servicing and wear out over time.

Figure 4:
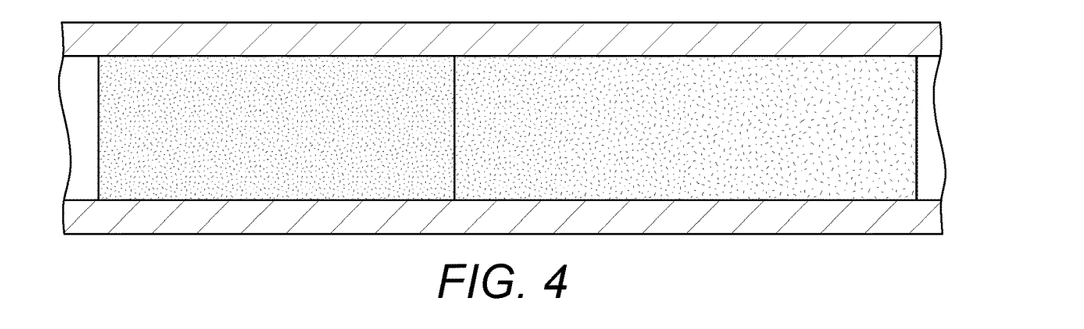
FIG. 4 illustrates a conduit with changes in flow restriction due to changes in porous media packing the conduit according to an embodiment.

FIG. 4 shows an alternative embodiment where the conduit has a constant cross section but the change in resistance to fluid flow is provided by materials with different porosity. Thus, in this embodiment the porosity of the materials increases from left to right, decreasing the resistance to flow. This is an alternative way of providing a change in resistance to flow and can be used instead of changing the diameter of the conduit or indeed in conjunction with such a change One advantage of having porous material within the conduit is that it provides a high surface area to volume ratio providing good thermal transfer and also encouraging changes in state.

Figure 5:
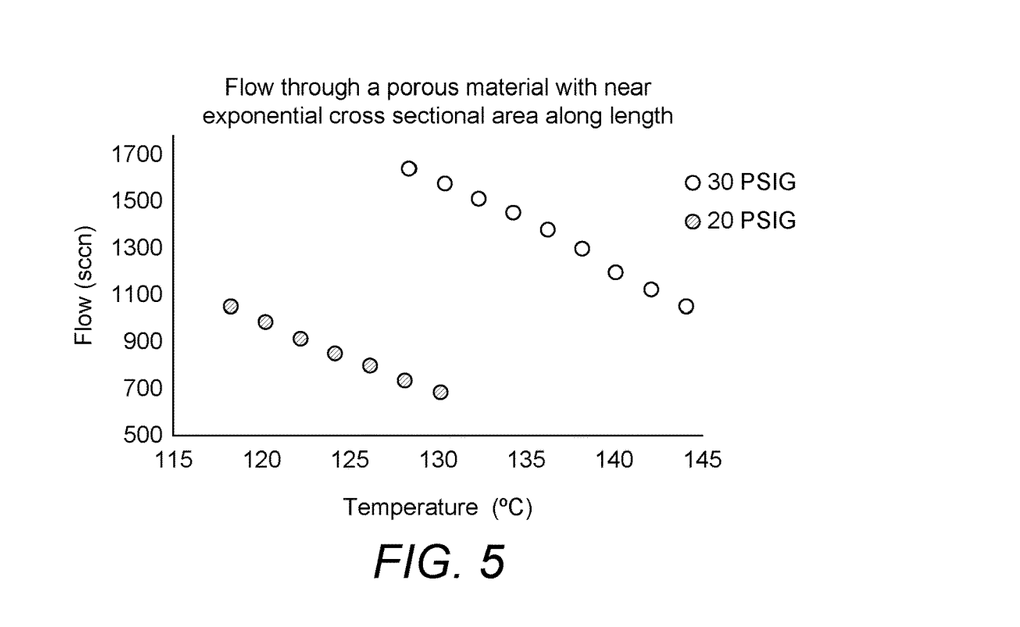
FIG. 5 illustrates changes in flow rate with temperature of a device according to an embodiment.

FIG. 5 shows flow rate change with temperature for two different pressure drops across a conduit according to FIG. 3. As can be seen the flow rate varies with temperature and thus, a change in temperature can be used to control the flow rate where the pressure drop across the conduit is constant. In this way, what is in effect a thermal valve is provided that has no moving parts and is simple and cheap to build and maintain.

Figure 6A:
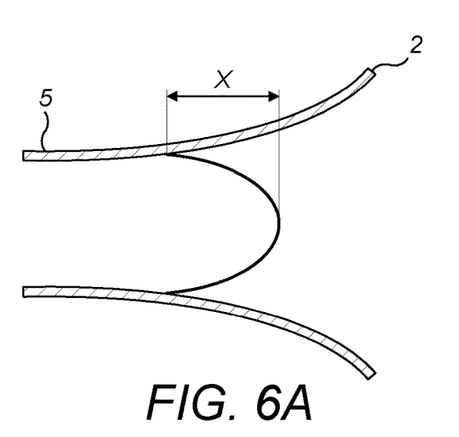
FIGS. 6A-6D show changes in a length of a region of vaporisation for different conduit embodiments.
Figure 6B:
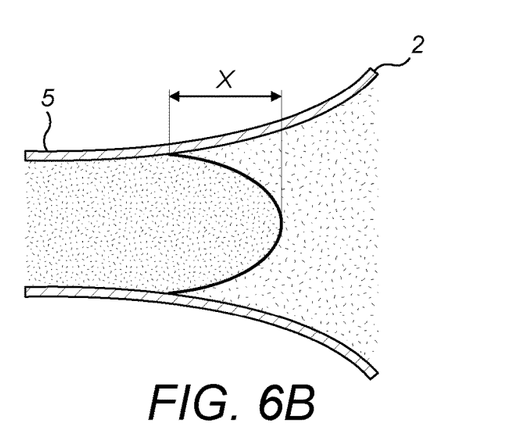
Figure 6C:
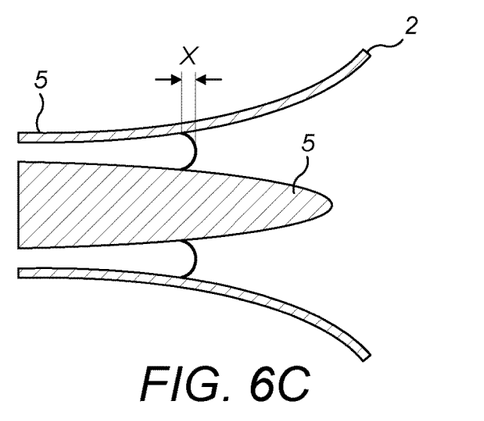

FIGS. 6a, b and c show how the region in which the change of state occurs is reduced longitudinally as thermal transfer to the fluid is improved. Thus, in the conduit 2 of FIG. 6a there are heaters 5 provided on the outer edge and no materials within the conduit such that the transfer of heat between the heaters and the fluid is relatively low and thus, the fluid on the outer surface of the conduit heats up before the fluid in the centre of the conduit resulting in an elongate region of vaporisation X. FIG. 6b shows how the use of high thermal conductive porous material within the conduit can reduce the longitudinal length of the region of vaporisation. And FIG. 6c shows how it is reduced still further if the heat is applied in both the centre of the conduit via the obstructing member and at the edges.

Figure 6D:
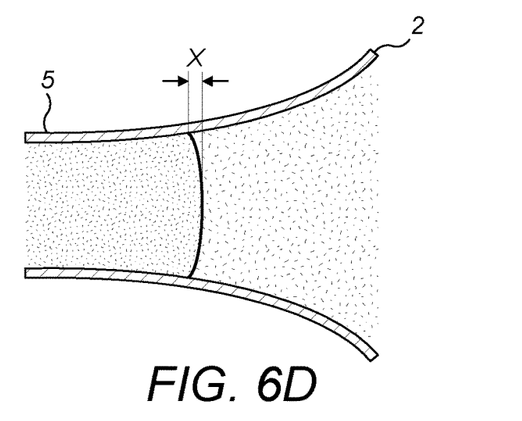

FIG. 6d shows an alternative embodiment where the length of the region is reduced and in this embodiment the porosity of the material packing the conduit is increased towards the centre such that the pressure of the fluid flowing towards the centre reduces which encourages vaporisation towards the centre. Thus, although the fluid may be warmer at the edges it can vaporise at a lower temperature towards the centre as the pressure is lower. Reducing the longitudinal length of the region of vaporisation provides a device that can provide stable vaporisation contained within the area of decreasing flow resistance across a wider range of operation as containing the region of vaporisation within the conduit is easier when this region is small.

Figure 7:
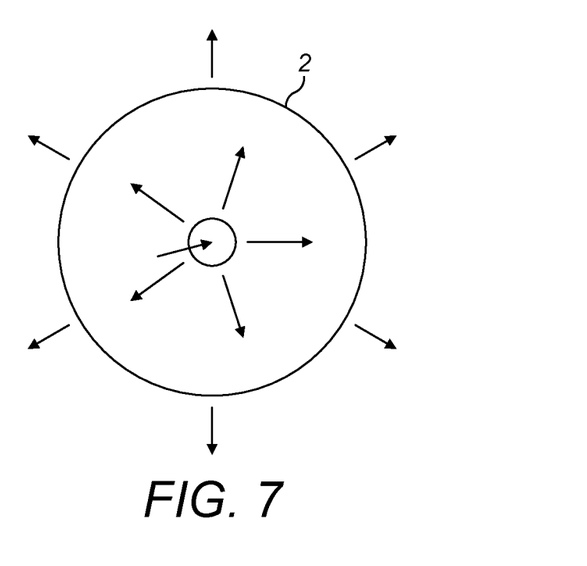
FIG. 7 shows a disk shaped conduit according to an embodiment.

FIG. 7 shows an alternative arrangement of a conduit 2 that acts as a vaporiser and has a circular disc formation with an inlet at the centre and an outlet at the edge. It should be noted that if it were to act as a condenser then the inlet could be on the edge surface and the outlet at the centre. The conduit is packed with a porous material and owing to the increasing surface area of the disc type conduit towards the edge the resistance to fluid flow reduces as the fluid moves towards the edge of the conduit. Similarly, it increases if it is moving from the outer edge towards the centre.

In alternative embodiments, the conduit may form a sphere structure which has similar advantages with changes in fluid flow resistance but where it is perhaps more difficult to control changes in temperature of the fluid. In addition to providing a change in resistance to flow by providing an increased cross sectional area in these conduits the conduits may be filled with or formed from porous materials with different porosity such that towards the outer edge the porosity increases providing a further decrease in resistance to fluid flow.

It should be noted that although elongate conduits and disc or spherical conduits have been shown other constructions such as square constructions or constructions with inner obstructing elements such as plugs or solid elements are envisaged.

It should be noted that where materials with varying resistance to flow are used as filler materials within the conduit then this variation in resistance to flow can be provided in many ways such as by particle size, particle compaction, particle shape and the open area percentage.

Similarly, where heat is supplied to the fluid this may be done in a number of ways such as using resistive or other type of heaters heating the outer surface of the conduit, using heaters embedded into the device or using induction heaters to directly heat the entire device. Alternatively, the device can derive its energy from the ambient surroundings or heat may be supplied by the liquid and/or gas inside the device or by combustion or other chemical reaction inside the device.

Figure 8:
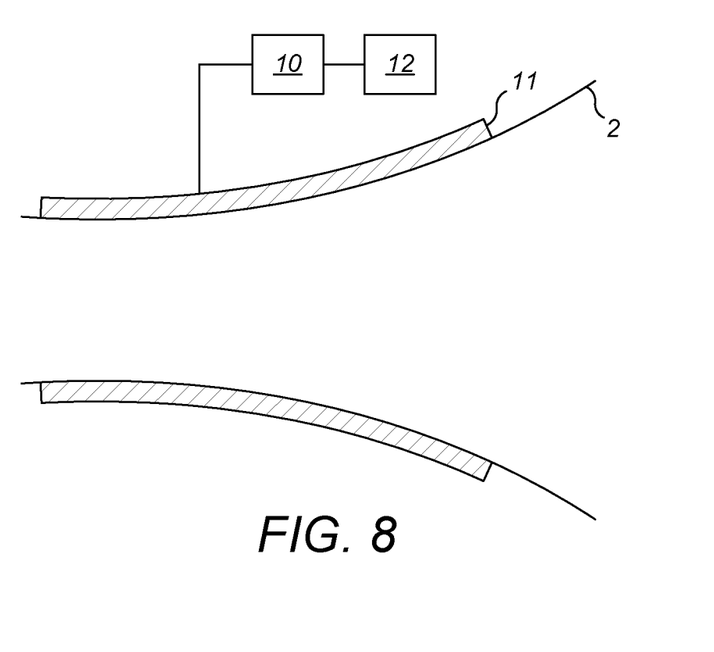
FIG. 8 shows a mass flow meter according to an embodiment.

FIG. 8 shows a mass flow rate meter according to an embodiment. The mass flow rate meter comprises a conduit 2, a temperature sensor 11 and an output device 12. The temperature sensor 11 measures the temperature along the conduit and detects a drop in temperature which indicates the location of the change of state. This location provides an indication of the mass flow rate of fluid through the conduit and control circuitry 10 will calculate this mass flow rate from the location and will output it via output device 12.

Although a single device has been shown in each figure, a multitude of these devices may be used together to similar effect.

Where temperature is being sensed within the device temperature sensors located axially along the device may be used and these may also be used to sense the region of vaporisation and provide feedback to the heater control algorithm as is shown in FIG. 8.

Embodiments of this invention can be used to provide liquid vaporisation and vapour delivery in a well-controlled and stable manner. Furthermore, embodiments reduce or obviate the need for carrier gas, mass flow controllers, liquid flow controllers, bubbler systems, buffer chambers, a boiling vessel, control valves and other external items and control systems. The device is compact and inexpensive. Furthermore, embodiments are easily expandable to very high or very low flow rates. Embodiments are reliable owing to the lack of moving parts that may wear out or change over time and provide stable operation over time and fine tuning of the control.

Embodiments have application in many vaporisation and condensation roles such as steam injection for abatement, steam generation and control for other processes, liquid chemical vaporisation and vapour control and delivery, water vapour delivery and humidification for agricultural, medical and industrial uses.

Embodiments may also be used to measure mass flow rate and in this way to provide a desired mass flow rate of a fluid.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A device for changing a fluid from one state to another state, said states comprising a liquid and a vapour state, said device comprising:
   an inlet configured to receive said fluid in a first state;
   an outlet configured to output said fluid in a second state;
   a conduit connecting said inlet to said outlet, said conduit being configured such that a resistance to flow changes along at least a portion of a flow axis within said conduit; and
   a controller configured to change where said fluid changes from the first state to the second state within said conduit by changing at least one of a temperature of said fluid and a pressure at least one of said inlet and said outlet;
   wherein the conduit comprises a controlled vaporisation device and said first state comprises a liquid and said second state comprises a vapour, said fluid flow being in a direction such that said resistance to flow decreases along said at least a portion of said flow axis of said conduit such that said resistance to flow is higher closer to said inlet than it is closer to said outlet.

2. The device according to claim 1, said device being configured to control a mass flow rate of a fluid flowing through said conduit by controlling where said fluid changes from the first state to the second state within said conduit.

3. The device according to claim 2, said device further comprising a measuring device configured to measure a parameter indicative of said flow rate of said fluid flowing through said conduit, said controller adjusting said at least one of said temperature of said fluid and said pressure at least one of said inlet and said outlet in response to an output from said measuring device.

4. The device according to claim 1, said device further comprising:
   at least one metering device configured to measure at least one of a temperature and a pressure of said fluid, said device being operable to determine a flow rate of said fluid from said at least one measurement; and
   an output device configured to output said flow rate.

5. The device according to claim 1, wherein said conduit is configured such that an effective hydraulic diameter of said conduit increases in one direction along said flow axis within said at least a portion of said conduit leading to a decrease in said resistance to fluid flow in said direction.

6. The device according to claim 5, wherein said conduit is configured such that a cross sectional area available for fluid flow of said conduit increases in one direction along said at least a portion of said conduit leading to a decrease in said resistance to fluid flow in said direction.

7. The device according to claim 1, wherein said conduit is at least partially filled with a material such that multiple fluid flow paths are provided through said material.

8. The device according to claim 7, wherein said material comprises at least one of a porous material, a powdered or granular material and a material formed of a plurality of strands.

9. The device according to claim 7, wherein at least one of a number of said fluid flow paths and a diameter of said fluid flow paths increases in one direction along said at least a portion of said conduit leading to a decrease in resistance to flow in said direction.

10. The device according to claim 7, wherein said conduit is an elongate structure and said flow axis is a longitudinal axis of said conduit and at least one of a number of said fluid flow paths and a diameter of said fluid flow paths either continually increases or decreases towards an outer edge of said longitudinal axis of said conduit.

11. The device according to claim 7 wherein said material is a material with a higher thermal conductivity than that of said fluid.

12. The device according to claim 1, wherein said conduit comprises an elongate structure and comprises an obstructing member running parallel to a longitudinal axis of and within said at least a portion of, said conduit.

13. The device according to claim 12, wherein said diameter of said central obstructing member changes along said longitudinal axis of said conduit.

14. The device according to claim 12, further comprising at least one of a heater configured to heat said obstructing member and a cooler configured to cool said obstructing member.

15. The device according to claim 1, comprising a plurality of said conduits.

16. The device according to claim 1, comprising a pressure controller for controlling a pressure of said fluid at least one of said inlet and said outlet.

17. The device according to claim 1, wherein said conduit is configured such that a resistance to flow changes exponentially along said at least a portion of said conduit.

18. A device for changing a fluid from one state to another state, said states comprising a liquid and a vapour state, said device comprising:
   an inlet configured to receive said fluid in a first state;
   an outlet configured to output said fluid in a second state;
   a conduit connecting said inlet to said outlet, said conduit being configured such that a resistance to flow changes along at least a portion of a flow axis within said conduit; and
   a controller configured to change where said fluid changes from the first state to the second state within said conduit by changing at least one of a temperature of said fluid and a pressure at least one of said inlet and said outlet;
   wherein the conduit comprises a controlled condenser and said first state comprises a gas and said second state comprises a liquid, said fluid flow being in a direction such that said resistance to flow increases along said at least a portion of said flow axis of said conduit such that said resistance to flow is higher closer to said outlet than it is closer to said inlet.

* * * * *